United States Patent
Vrolijk et al.

(10) Patent No.: US 12,455,076 B2
(45) Date of Patent: Oct. 28, 2025

(54) METHOD FOR EVALUATING A QUASI-STATIONARY PRESSURE DIFFERENCE DETECTABLE BY A SENSOR AT A GAS BOILER, AND ASSOCIATED GAS BOILER

(71) Applicant: ebm-papst Landshut GmbH, Landshut (DE)

(72) Inventors: Enno Jan Vrolijk, Dalen (NL); Jens Hermann, Landshut (DE); Markus Weingart, Rottenburg (DE); Andreas Kerschreiter, Eching (DE); Bernhard Simon, Munich (DE)

(73) Assignee: ebm-papst Landshut GmbH, Landshut (DE)

(*) Notice: Subject to any disclaimer, the term of this patent is extended or adjusted under 35 U.S.C. 154(b) by 410 days.

(21) Appl. No.: 17/969,003

(22) Filed: Oct. 19, 2022

(65) Prior Publication Data

US 2023/0118991 A1 Apr. 20, 2023

(30) Foreign Application Priority Data

Oct. 20, 2021 (DE) .................. 10 2021 127 225.4

(51) Int. Cl.
*F23N 1/02* (2006.01)
*F23N 5/18* (2006.01)
*F23N 5/24* (2006.01)

(52) U.S. Cl.
CPC ............ *F23N 5/242* (2013.01); *F23N 1/022* (2013.01); *F23N 5/184* (2013.01);
(Continued)

(58) Field of Classification Search
CPC . F23N 5/242; F23N 5/184; F23N 5/18; F23N 1/022; F23N 2005/181;
(Continued)

(56) References Cited

U.S. PATENT DOCUMENTS

2013/0036833 A1* 2/2013 Nakada ................ G01F 25/15
73/861.42

FOREIGN PATENT DOCUMENTS

| CA | 2773654 A1 * | 1/2006 | ............. F23N 1/022 |
| CN | 110425522 A * | 11/2019 | ............. F23D 11/24 |

(Continued)

OTHER PUBLICATIONS

German Search Report dated Jul. 15, 2022 in corresponding German Application No. 10 2021 127 225.4.
(Continued)

*Primary Examiner* — Jeffrey P Aiello
(74) *Attorney, Agent, or Firm* — Harness, Dickey & Pierce, P.L.C.

(57) ABSTRACT

A method for evaluating a quasi-stationary pressure difference detectable by a sensor at a gas boiler. The gas boiler has a mixing device (4), a fan (5), a main flow regulator (3), a control valve (2) and a safety valve (1). The sensor detects a differential pressure between a pressure (p2) at a measuring point upstream of the main flow regulator (3) and downstream of the control valve (2) and a reference pressure (p0, p1) at a reference measuring point. The sensor transmits a signal to an electronic evaluation system. The electronic evaluation system compares the differential pressure during a pre-purge phase, wherein the safety valve (1) is closed, with the differential pressure after the pre-purge phase and detects an error by the comparison.

10 Claims, 1 Drawing Sheet

(52) U.S. Cl.
CPC .... *F23N 2005/185* (2013.01); *F23N 2225/04* (2020.01); *F23N 2227/16* (2020.01); *F23N 2231/12* (2020.01); *F23N 2235/12* (2020.01)

(58) Field of Classification Search
CPC ........... F23N 2005/185; F23N 2225/04; F23N 2225/06; F23N 2227/16; F23N 2227/04; F23N 2231/10; F23N 2231/12; F23N 2233/08; F23N 2233/06; F23N 2235/12; F23N 2235/16; F23N 2235/18; F23N 2241/02; F23N 2241/04; F23N 2241/06; F23K 2900/05001; F23K 2900/05002; F23K 2400/201; F23K 2203/104; F23K 5/007; F23K 5/147; F23D 14/02; F23D 14/60; F23D 14/36; F23D 14/62; F23D 2201/20
USPC ..... 73/23.31, 700; 110/189, 185; 137/487.5, 137/557; 236/14, 15 E, 15 R; 251/129.04; 431/12, 76, 90, 89, 75; 700/275, 282, 274; 702/183, 24, 108, 702/179, 45, 182, 23, 31, 35, 34, 33, 50, 702/85, 81, 189, 188
See application file for complete search history.

(56) References Cited

FOREIGN PATENT DOCUMENTS

| | | | | |
|---|---|---|---|---|
| DE | 19918901 C1 | * | 5/2001 | ............. F23D 14/60 |
| DE | 102005033611 B3 | | 10/2006 | |
| EP | 1259764 B1 | * | 6/2005 | ............. F23N 1/002 |
| EP | 2966354 A1 | * | 1/2016 | ............. F23N 1/022 |
| EP | 3404326 A1 | * | 11/2018 | ............. F23N 1/022 |
| JP | S60213729 A | * | 10/1985 | ............. F23N 1/025 |
| JP | 5124410 B2 | * | 1/2013 | ............. F17C 13/04 |
| WO | WO-2009091935 A1 | * | 7/2009 | ......... G01F 25/0038 |

OTHER PUBLICATIONS

Partial European Search Report dated Mar. 31, 2023 in corresponding European Application No. 22201795.6 (13 pages).

* cited by examiner

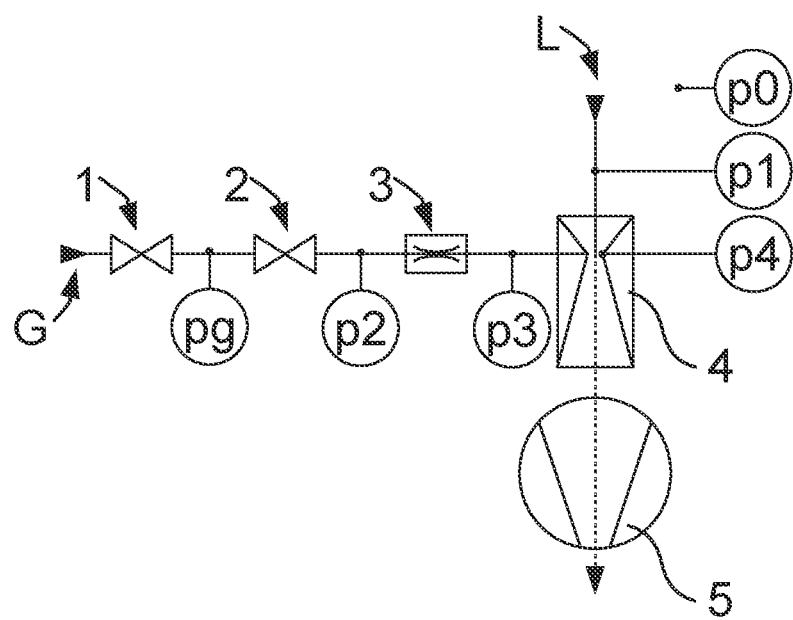

METHOD FOR EVALUATING A QUASI-STATIONARY PRESSURE DIFFERENCE DETECTABLE BY A SENSOR AT A GAS BOILER, AND ASSOCIATED GAS BOILER

CROSS-REFERENCE TO RELATED APPLICATION

This application claims the benefit and priority of Germany Application No. 10 2021 127 225.4, filed Oct. 20, 2021. The entire disclosure of the above application is incorporated herein by reference.

FIELD

The disclosure relates to a method for evaluating a quasi-stationary pressure difference detectable by a sensor at a gas boiler, and to a gas boiler designed to carry out the method.

In the prior art, gas boilers are known where a pressure difference upstream of a main flow regulator is measured with respect to a reference pressure by a sensor. The sensor is designed as a differential pressure sensor. The fuel mass flow is controlled based on the pressure difference.

In principle, a gas boiler usually comprises, in addition to other components, a mixing device, a fan, a main flow regulator, a control valve and a safety valve. The mixing device mixes a fuel flowing in from a fuel inlet and air flowing in from an air inlet to form a fuel-air mixture. The fan is for the intake of the fuel and the air through the mixing device. The main flow regulator limits a mass flow of the fuel into the mixing device. The control valve is arranged upstream of the main flow regulator to control a mass flow of the fuel into the mixing device. The safety valve is arranged upstream of the control valve for interrupting the mass flow of the fuel. The gas-air mixture can then be subsequently supplied to a burner where the mixture can be combusted.

To control the pressure of the inflowing fuel, the control valves in the prior art often operate as a mechanical-pneumatic gas valve where a pressure difference is detected by a control diaphragm arranged between two regions of different pressure.

Alternatively, however, in the context of so-called "electronic control", pressure sensors are also used the pressures are detected by separate sensors and the pressure values are evaluated electronically to determine the pressure difference. Depending on the evaluation, an electronically controllable control valve or gas valve is controlled or regulated.

In a device for controlling the gas-air mixture of a gas boiler, for example, the pressure upstream of the main flow regulator is measured with respect to a reference pressure by a differential pressure sensor. The sensor measures the differential pressure or the pressure difference between two pressure tappings.

In this case, an electronic gas valve is usually actuated by a digital controller which is implemented, for example, on a microcontroller or another control device. The determined offset pressure or the pressure difference is to be adjusted to the desired or specified target value.

Since the target value of the pressure or the pressure difference is usually 0 Pa, the term "electronic zero pressure control" is often used.

Regardless of whether it is an electronic or mechanical-pneumatic control, the function is limited in each case to the control of the gas boiler based on the pressure difference without being able to provide additional functionalities.

However, it would be desirable to be able to monitor a gas boiler with regard to further characteristic values, in order to be able to detect errors in the gas boiler depending on the characteristic values and to be able to control or regulate the boiler depending on the characteristic values and to be able to take further measures, in particular to extend the service life of the boiler.

As far as it is possible at all in the known gas boilers to record additional characteristic values or detect errors, this requires additional sensors and evaluating devices, that are complex and expensive.

SUMMARY

It is an object of the disclosure to overcome the above-mentioned disadvantages and to provide a method where errors in a gas boiler can be detected and evaluated in a simple and cost-effective manner.

This object is achieved by the combination of features according to a method for evaluating a quasi-stationary pressure difference detected by a sensor at a gas boiler. The sensor is a differential pressure or a mass flow sensor. The gas boiler has a mixing device, a fan, a main flow regulator, a control valve and a safety valve. The mixing device mixes a fuel flowing in from a fuel inlet and air flowing in from an air inlet to form a fuel-air mixture. The fan is for the intake of the fuel and the air through the mixing device. The main flow regulator limits a mass flow of the fuel into the mixing device. The control valve, arranged upstream of the main flow regular, controls a mass flow of the fuel into the mixing device. The safety valve, arranged upstream of the control valve, interrupts the mass flow of the fuel including detecting a differential pressure between a pressure at a measuring point upstream of the main flow regulator and downstream of the control valve and a reference pressure ($p0$, $P1$) at a reference measuring point. Transmitting the differential pressure to an electronic evaluation system. Comparing the differential pressure during a pre-purge phase where the safety valve is closed with the differential pressure after the pre-purge phase and detecting an error by the comparison.

According to the disclosure, a method is proposed for evaluating a quasi-stationary pressure difference detectable by a sensor at a gas boiler. Here, the sensor is a differential pressure sensor or a mass flow sensor. It is further provided that the gas boiler comprises a mixing device, a fan, a main flow regulator, a control valve, and a safety valve. The mixing devices mixes a fuel flowing in from a fuel inlet and air flowing in from an air inlet to form a fuel-air mixture. The fan is for the intake of the fuel and the air through the mixing device. The main flow regulator limits a mass flow of the fuel into the mixing device. The control valve is arranged upstream of the main flow regulator to control a mass flow of the fuel into the mixing device. The safety valve is arranged upstream of the control valve to interrupt the mass flow of the fuel. The sensor detects a differential pressure between a pressure at a measuring point arranged upstream of the main flow regulator and downstream of the control valve and a reference pressure at a reference measuring point and transmits the differential pressure to an electronic evaluation system. The electronic evaluation system compares the differential pressure with the differential pressure during a pre-purge phase where the safety valve is closed and detects an error after the pre-purge phase by the comparison.

In the pre-purge phase, as is known to the person skilled in the art, the gas boiler is purged with air without adding gas, which is made possible by the closed safety valve. Usually, the pre-purge phase is performed at the beginning of the operation or during an initialization of the gas boiler.

The error detection after the pre-purge phase refers to all further operating phases or operating modes after the pre-purging of the gas boiler and in particular to a set-up operation where the gas boiler can be calibrated, and to a continuous operation of the gas boiler.

In this context, a quasi-stationary pressure difference is understood to be a pressure difference that does not fluctuate or only fluctuates within a predetermined tolerance range. For example, a fluctuation of the pressure difference by 1% around an average value of the pressure difference can be understood as quasi-stationary.

Insofar as predetermined or previously known values and/or ranges are referred to, they can be stored or are at least storable in the electronic evaluation system.

From known data stored in the electronic evaluation system, that can be determined in the course of a calibration of the gas boiler or, for example, entered by a user, various states or errors in the system can be detected and/or checked for plausibility. In doing so, the state or error determination is carried out in particular by physical and logical observations of the states and values prevailing in the system. State detection by machine learning, e.g. by neural networks, is also possible. In addition, tolerance ranges or, in general, tolerance values can be generated or extended using machine learning.

A basis for the proposed methods is the signal of the differential pressure sensor which, for example, measures the offset pressure p2 during normal operation of the "electronic zero pressure control", for example, if the gas type is known and the main flow regulator is defined, the offset pressure can be used to calibrate the gas valve characteristic curve.

According to a first advantageous variant of the method, the error is an incorrect or incorrectly inserted main flow regulator and the method comprises the following steps:
a. identifying a first differential pressure $p(t_{pp})$, with the sensor at a time $t_{pp}$ during the pre-purge phase with the safety valve closed, a defined position of the control valve and a fan speed of the fan;
b. identifying a second differential pressure $p(t_s)$, with the sensor at a time $i_s$ after the time $t_{pp}$ at which the second differential pressure $p(t_s)$ is quasi-stationary, with the safety valve open, the defined position of the control valve and the fan speed of the fan;
c. determining a pressure difference between the second differential pressure $p(t_s)$ and the first differential pressure $p(t_{pp})$, in particular by subtracting the first differential pressure $p(t_{pp})$ from the second differential pressure $p(t_s)$, and determination of a fuel mass flow rate of the known fuel through the main flow regulator from the pressure difference and the defined position of the control valve by the electronic evaluation system;
d. determining an actual pressure loss coefficient of the main flow regulator from the fuel mass flow and the pressure difference by the electronic evaluation system;
e. matching the actual pressure loss coefficient by the electronic evaluation system with a target pressure loss coefficient of a provided main flow regulator stored in the electronic evaluation system.

In the event of a deviation of the actual pressure loss coefficient from the target pressure loss coefficient outside a predetermined tolerance, the electronic evaluation system detects that a main flow regulator used in the gas boiler does not correspond to the intended main flow regulator. Thus, the main flow regulator used is therefore an incorrect or incorrectly inserted main flow regulator, which corresponds to the error to be detected.

If a faulty or incorrect main flow regulator is to be detected, the fuel used, a characteristics of the mixing device and a gas valve characteristic curve of the control valve are preferably known. These values are accordingly determined beforehand and/or stored in the electronic evaluation system.

Alternatively, a second advantageous variant provides that the error is an uncalibrated or incorrectly calibrated control valve, wherein the method comprises the following steps:
a. identifying a first differential pressure $p(t_{pp})$, with the sensor at a time $t_{pp}$ during the pre-purge phase with the safety valve closed, a defined position of the control valve and a predetermined or known fan speed of the fan;
b. identifying a second differential pressure $p(t_s)$, with the sensor at a time $i_s$ at which the second differential pressure $p(t_s)$ is quasi-stationary, with the safety valve open, the defined position of the control valve and the fan speed of the fan;
c. determining a pressure difference between the second differential pressure $p(t_s)$ and the first differential pressure $p(t_{pp})$, in particular by subtracting the first differential pressure $p(t_{pp})$ from the second differential pressure $p(t_s)$, and determination of a fuel mass flow of the known fuel through the control valve from the pressure difference and a defined pressure loss characteristics of the main flow regulator by the electronic evaluation system, wherein the mass flow through the control valve and the defined position of the control valve form a pair of values belonging to an actual characteristic curve of the control valve;
d. determining a deviation of the actual characteristic curve of the control valve from a target characteristic curve of the control valve by the electronic evaluation system by comparing the pair of values with the target characteristic curve of the control valve.

In the event of a deviation of the value pair from the target characteristic curve of the control valve outside of a predetermined tolerance, the electronic evaluation system detects an uncalibrated or incorrectly control valve.

Preferably, it is further provided that the target characteristic curve of the control valve is shifted by the deviation and thus approximated to the actual characteristic curve.

Furthermore, not only is it detected that the control valve is uncalibrated or incorrectly calibrated, but that the control valve is calibrated in-situ. By determining the actual characteristic curve, the latter can be used as a target characteristic curve or measures can be taken to further approximate the actual characteristic curve to the target characteristic curve.

For this purpose, it is advantageous if the fuel used, the main flow regulator and the characteristics of the mixing device are known. Accordingly, these values are determined beforehand and/or stored in the electronic evaluation system.

In addition to the first two variants of the method, an alternative third variant provides that the error is an incorrect fuel and that the method comprises the following steps:
a. identifying a first differential pressure $p(t_{pp})$, with the sensor at a time $t_{pp}$ during the pre-purge phase with the safety valve closed, a defined position of the control valve and a fan speed of the fan;
b. identifying a second differential pressure $p(t_s)$, with the sensor at a time $i_s$ where the second differential pressure $p(t_s)$ is quasi-stationary, with the safety valve open, the defined position of the control valve and the fan speed of the fan;
c. determining a pressure difference between the second differential pressure $p(t_s)$ and the first differential pressure $p(t_{pp})$, in particular by subtracting the first differential pressure $p(t_{pp})$ from the second differential pressure $p(t_s)$;
d. determining an actual fuel flowing in from the fuel inlet from the pressure difference, the defined position of the control valve and the predetermined mass flow delivered by the fan through the mixing device as well as a defined pressure loss characteristics of the main flow regulator;
e. comparing the actual fuel with a predetermined target fuel.

The electronic evaluation system detects an incorrect fuel, i.e. an error, if the actual fuel does not correspond to the target fuel.

Thus, it can be checked for plausibility whether a supposedly used fuel is actually used.

For the determination or plausibility check of the fuel, it is further advantageous if the main flow regulator used, the characteristics of the mixing device and the gas valve characteristic curve of the control valve are known. Accordingly, these values are determined beforehand and/or stored in the electronic evaluation system.

Additionally or alternatively to the method variants already described, the error is a missing or too low fuel pressure pg of the fuel flowing in through the fuel inlet and/or an incorrectly installed or not installed main flow regulator. If such an error or errors is or are to be detected, the method comprises the following steps:
a. opening the safety valve;
b. igniting a burner of the gas boiler;
c. identifying whether the burner has been ignited;
d. if the burner has not been ignited, identifying a differential pressure curve with the sensor and the electronic evaluation system with the safety valve open for a predetermined time.

The electronic evaluation system compares the differential pressure curve with a predetermined tolerance field and the error is detected if the pressure curve lies outside the tolerance field. Thus, a differential pressure that does not increase over the predetermined time and thus a missing or too low fuel pressure pg and/or an incorrectly installed or not installed main flow regulator is detected.

Preferably, the fuel used, the main flow regulator used, the characteristics of the mixing device and the gas valve characteristic curve of the control valve are known for this purpose. Accordingly, these values are determined beforehand and/or stored in the electronic evaluation system.

In a further advantageous further refinement, a maximum permissible heating output of the gas boiler and/or a maximum permissible fan speed of the fan are/is reduced to a respective predetermined value if the fuel pressure pg is missing or too low, in order to prevent damage.

Furthermore, an advantageous variant of the method can provide that the error is a non-existent or unconnected sensor and/or a poor or non-existent connection of the sensor to the measuring point and/or the reference measuring point. In this case, a pressure difference is detected between the pressure at the measuring point, which is located upstream of the main flow regulator and downstream of the control valve, and a reference pressure at a reference measuring point. The electronic evaluation system recognizes the sensor as not present or not connected and/or as having a poor or non-existent connection to the measuring point and/or the reference measuring point if the differential pressure is outside a predetermined tolerance range.

Here, an advantageous refinement for preventing or at least minimizing damage provides that the safety valve is closed in the event of a sensor not being present or not being connected and/or having a poor or non-existent connection with the measuring point and/or the reference measuring point.

In this case too, the fuel used, the main flow regulator used, the characteristics of the mixing device and the gas valve characteristic curve of the control valve are preferably known. Accordingly, these values are identified beforehand and/or stored in the electronic evaluation system.

As an alternative or in addition to the preceding method refinements, the error is a defective safety valve or a defective control valve, the method in this case comprising the following steps:
a. identifying an actual differential pressure with the sensor with the safety valve open, a defined position of the control valve and a predetermined mass flow delivered by the fan through the mixing device;
b. determining a target differential pressure by the electronic evaluation system and a defined position of the control valve;
c. determining a deviation of the actual differential pressure from the target differential pressure.

In this case, the electronic evaluation system detects an or the error if the deviation is greater than a predetermined tolerance value which can be stored in particular in the electronic evaluation system.

A further aspect of the disclosure relates to a gas boiler designed to carry out a method according to the disclosure.

The features disclosed above can be combined in any desired manner, insofar as this is technically possible and these features do not contradict one another.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are indicated in the subclaims or are illustrated in more detail below together with the description of the preferred embodiment of the disclosure with reference to the FIGURE. In the FIGURE:

FIG. 1 is an exemplary schematic illustration of a gas boiler.

DETAILED DESCRIPTION

FIG. 1 shows schematically a part or a detail of a gas boiler. A Venturi mixer is shown as a mixing device 4 where air from the environment with an air pressure p0 is sucked through an air inlet L by a fan 5. In the mixing device 4, the incoming air and a fuel (gas) flowing in through the fuel supply G are mixed to form a fuel-air mixture.

The fuel, in particular a gas, flowing in from the fuel supply G, flows through a safety valve 1, a control valve 2 and the main flow regulator 3. The safety valve 1 preferably has an open position and a closed position where the flow of the fuel through the safety valve 1 is blocked. The control valve 2 is designed to control the volume flow of the fuel so that the volume flow of the fuel through the control valve 2 to the mixing device 4 is adjustable. By adjusting or controlling the volumetric flow of the fuel through the control valve 2, the mixing ratio of the fuel-air mixture can be adjusted.

Furthermore, at least one differential pressure sensor is provided. It is designed to determine the differential pressure between the pressure p2 of the fuel upstream of the main flow regulator 3 and downstream of the control valve 2 and a reference pressure. The reference pressure is preferably the ambient pressure p0 or a pressure p1 of the air in an air-carrying feed line to the mixing device 4. For this purpose, the differential pressure sensor can have, for example, a respective pressure sensor or pressure transducer to detect a respective pressure p0, p1, p2. Moreover, further pressure sensors can be provided to detect the further pressures pg, p3 and p4, which can serve as reference pressure sensors to detect a reference pressure or to check the plausibility of the pressures p0, p1, p2.

The fuel-air mixture is conveyed by the fan 5 to a burner of the gas boiler, which is not shown, where the fuel-air mixture is combusted.

In the following, the system illustrated in FIG. 1 is used as an example to detect errors or conditions and, if necessary, to determine or check the plausibility of values.

In a first case, for example, an installed main flow regulator 3 is to be detected by a differential pressure determined by the differential pressure sensor.

It is advantageous here if the control pressure-venturi characteristics of the system, i.e., the gas boiler, is known. A venturi mixer as a mixing device 4 is not absolutely necessary, a pressure reduction element upstream of the mixing point of air and fuel (gas) with known pressure reduction characteristics is sufficient. In addition, the gas type (fuel type) should be known. The gas type can be stored on the electronic evaluation system by the installer or at the factory, or a sensor provided for this purpose detects the composition of the gas, for example, at the gas inlet G.

With the control valve 2 preferably already being calibrated and a defined position of the actuator of the control valve 2, the gas mass flow that flows through the control valve 2 in the installed state can be inferred. In this case, it is assumed that the upstream pressure regulator of control valve 2 operates ideally and the mass flow through control valve 2 does not depend on the inlet pressure pg. The offset pressure p2 upstream of the main flow regulator 3 is measured, for example, with a pressure sensor as part of the differential pressure sensor.

The air density, which affects the control pressure of the mixing device 4 for a given air mass flow, can be entered manually beforehand by the installer. Alternatively, the air density can be detected by a sensor. With an appropriate geometric arrangement, this can also be done by the sensor, which can be used to determine the type of gas when the safety valve 1 is open.

In the pre-purge phase (time $t=t_{pp}$) of the gas boiler, where the safety valve 1 is closed, a negative pressure pv, generated by the mixing device 4 at a speed N of the fan 5, is measured by a pressure sensor at the point p2.

Due to the closed safety valve 1 during the pre-purge phase, it holds: $p2(t_{pp})=p3(t_{pp})=p4(t_{pp})=pv(t_{pp})$.

With the measured pressure p2 and pv, respectively, and a function or table stored in the electronic evaluation system for this system including the mixing device 4 and main flow regulator 3, an air mass flow is calculated. Depending on the requirement for accuracy, this calculation can be corrected with the air density.

After the pre-purge phase, at a constant speed N, the desired pilot position of the actuator of the control valve 2 is first approached and the ignition of the gas boiler is activated and subsequently the safety valve 1 is opened. As soon as a combustible mixture is present at the ignition electrode of the gas boiler, the fuel-air mixture burns at the burner of the gas boiler and the pressure p2 stabilizes from a point in time $t_s$, i.e., a quasi-stationary state is present.

The measured (or specifically adjusted) pressure $p2(t_s)$ together with the previously measured pressure $p2(t_{pp})$ now results in the driving pressure difference $dp=p2(t_s)-pv(t_s)$ via the series connection of flow resistors including the main flow regulator 3 and further resistors in the mixing device 4. Further resistors can be, for example, deflectors downstream of the main flow regulator 3 as well as the openings at the point of the air-gas mixture ("gas pockets").

If necessary, the speed N of the fan 5, for detecting the installed main flow regulator 3, can also be changed to use multiple measuring points.

With the gas mass flow determined via the gas valve characteristic curve and the pressure difference dp, the pressure loss coefficient of the main flow regulator 3 can be calculated.

The pressure loss of the further flow resistors should also be considered in this calculation. In particular, if the pressure loss across the main flow regulator 3 is dominant with respect the total pressure loss dp, the installed main flow regulator 3 (or the associated pressure loss coefficient) can be determined with sufficient accuracy.

If there is no ignitable mixture at the burner of the gas boiler at the time of ignition, further ignition attempts can be made, possibly also with the adapted pilot position of the control valve 2.

In principle, the detection of the installed main flow regulator 3 can also be carried out without combustion of the gas-air mixture in the burner. In this case, it must be ensured at all times that the potentially combustible gas-air mixture is conveyed out of the gas boiler after a certain safety time by a safety purge (purging) by the fan 5.

It is also a prerequisite that the measured pressure $p2(t_s)$ reaches a quasi-stationary state. If the measured pressure difference is completely outside a predetermined tolerance range, too low or missing inlet pressure may also be responsible for the faulty ignition.

In a second case, for example, it should be possible to detect an incorrectly calibrated control valve 2. If necessary, the control valve 2 can be calibrated during operation (in-situ).

It is again advantageous if a control pressure-venturi characteristics of the system is known. Here too, a venturi mixer as mixing device 4 is not necessarily required, a pressure reduction element upstream of the mixing point of air and fuel with known pressure reduction characteristics is sufficient as mixing device 4. In addition, the gas type (fuel type) should be known. The gas type can be stored on the evaluation electronics by the installer or at the factory, or it can be detected by an appropriate sensor.

In addition to the aforementioned data, a known system of flow resistors downstream of the main flow regulator 3 (baffles and gas pockets) as well as a main flow regulator 3, with known pressure loss characteristics, is advantageous for the in-situ calibration of the control valve 2. The installed main flow regulator 3 can be stored on the electronic evaluation system by the installer or at the factory, or the main flow regulator 3 is mechanically/electronically/color-coded by the manufacturer in such a manner that the electronic evaluation system, which evaluates the measurement data, recognizes the main flow regulator 3.

As in the first case described, a pressure difference pv is identified during a pre-purge phase. A differential pressure is identified when the flame is ignited and in a quasi-stationary state.

Here too, the speed N of the fan 5 can be changed if necessary in order to be able to identify several measurement points. In the application, however, often only one measuring point is required to determine the offset pressure of the characteristic curve of the control valve 2.

With the pressure difference dp determined in this manner and a known total pressure loss characteristics of main flow regulator 3 and any flow resistors possibly arranged downstream, the flow rate (mass flow) through control valve 2 can be calculated.

If there is no ignitable mixture in the burner of the gas boiler at the time of ignition, further ignition attempts can be made, possibly also with an adapted pilot position of the control valve 2. If these ignition attempts are also unsuccessful, the detection of the control valve 2 and/or the in-situ calibration of the control valve 2 can be carried out without combustion of the gas-air mixture.

Furthermore, the calibration of the control valve 2, during commissioning of the gas boiler, can in principle also be carried out without combustion of the gas-air mixture. In this case, it has to be ensured at all times that the potentially combustible gas-air mixture is conveyed out of the gas boiler after a certain safety time by a safety purge (purging) with the aid of the fan 5.

As before, the pressure difference $p2(t_s)$ should be in a quasi-stationary state.

The described procedure for calibrating the control valve 2 can also be used to calibrate the control valve 2 at the factory during manufacturing, rather than in-situ during commissioning of the gas boiler. This calibration procedure can also be performed with air flowing through the control valve 2. If the in-situ calibration is performed in manufacturing, the calibration parameters can be stored directly on an electronic circuit of the control valve 2 without direct communication of the manufacturing equipment with an electronic circuit of the gas boiler.

In a third case, a gas used as fuel is to be checked for plausibility or a faulty gas is to be detected.

Once again, a control pressure-venturi characteristics of the system is preferably known. Here too, a venturi mixer is not necessarily required as the mixing device 5. A pressure reduction element upstream of the mixing point of air and fuel as mixing device 5 with a known pressure reduction characteristics is sufficient.

For the plausibility check of the gas used as fuel or a fault detection to that effect, it is advantageous if the system of flow resistors downstream of the main flow regulator 3 (baffles and gas pockets) is known. A main flow regulator 3 with known pressure drop characteristics is used. The installed main flow regulator 3 can be stored, i.e. saved, on the electronic evaluation system by the installer or at the factory. Alternatively, the main flow regulator 3 can also be mechanically/electronically/color-coded in such a manner that the electronic evaluation system, which evaluates the measurement data, recognizes the main flow regulator 3.

As in the two previously explained cases, in the case of an electronic control valve 2 calibrated, for example, at the factory, it is possible to infer the gas mass flow that flows through the control valve 2 in the installed state for a given position of the actuator of the control valve 2. In this case, it is assumed that the upstream pressure regulator of the control valve 2 operates ideally and the mass flow through the control valve 2 does not depend on the inlet pressure pg of the gas. The offset pressure p2 upstream of the main flow regulator 3 is measured by a pressure sensor that can be part of the differential pressure sensor. The pressure sensor can either be installed upstream of the main flow regulator 3 or installed on an electronic board of other components. The sensor is connected to a representative pressure measuring point upstream of the main flow regulator 3 by hoses/pipes.

The air density, which can influence the control pressure of the mixing device 4 for a given air mass flow, can be entered manually beforehand by a user. Alternatively, the air density can also be identified by a sensor.

As before, in a pre-purge phase (time $t=t_{pp}$) or during a purging of the gas boiler, the negative pressure pv, which is generated by the mixing device 5 at a speed N of the fan 5, can be measured by a pressure sensor at the point p2. Due to the closed safety valve 1 during the pre-purge phase, it holds again: $p2(t_{pp})=p3(t_{pp})=p4(t_{pp})=pv(t_{pp})$. With the measured pressure p2 and a function or table stored in the evaluation unit, an air mass flow can be calculated for this system including the mixing device 4 and main flow regulator 3. Depending on the requirement for accuracy, this calculation can be corrected with the air density of the air flowing through the air inlet L.

After the pre-purge phase, at a constant speed N, the desired pilot position of the actuator of the control valve 2 is first approached and the ignition of the gas boiler is activated. Subsequently, the safety valve 1 is opened. As soon as a combustible mixture is present at the ignition electrode of the gas boiler, the gas-air mixture burns at the burner of the gas boiler. The pressure p2 stabilizes from the point in time ts, so that a quasi-stationary state of the pressure p2 or the differential pressure exists. The measured (or specifically adjusted) pressure $p2(t_s)$ together with the previously measured pressure $p2(t_{pp})$ now results in the driving pressure difference $dp=p2(t_s)-pv(t_s)$ via the series connection of flow resistors including the main flow regulator 3 and possible further resistors in the mixing device 4. Further resistors can be, e.g., baffles downstream of the main flow regulator 3 and openings in the mixing device 4 at the point of air-gas mixing ("gas pockets").

Here too, if necessary, the speed N can be changed to use multiple measurement points.

With the measured pressure difference dp, the known mass flow at a fixed or unchanged position of the control valve 2 and the known total pressure loss characteristics of the main flow regulator 3 and downstream flow resistors, the gas type or composition of the gas flowing through gas inlet G can be checked for plausibility.

The disclosure is not limited in its embodiment to the preferred exemplary embodiments indicated above. Rather, a number of variants is conceivable, which make use of the presented solution even in fundamentally different embodiments.

What is claimed:

1. A method for evaluating a quasi-stationary pressure difference detectable by a sensor at a gas boiler, the sensor is a differential pressure sensor or a mass flow sensor, the gas boiler has a mixing device, a fan, a main flow regulator, a control valve and a safety valve, the mixing device mixes a fuel flowing in from a fuel inlet and air flowing in from an air inlet to form a fuel-air mixture, the fan is for intake of the fuel and the air through the mixing device, the main flow regulator limits a mass flow of the fuel into the mixing device, the control valve, arranged upstream of the main flow regulator, controls a mass flow of the fuel into the mixing device, the safety valve, arranged upstream of the control valve, interrupts the mass flow of the fuel, the method comprising:
- detecting a differential pressure between a pressure at a measuring point upstream of the main flow regulator and downstream of the control valve and a reference pressure (p0, p1) at a reference measuring point;
- transmitting the differential pressure to an electronic evaluation system;
- comparing the differential pressure during a pre-purge phase where the safety valve is closed with the differential pressure after the pre-purge phase; and
- detecting an error by the comparison;
- the error is a non-existent or unconnected sensor and/or a poor or non-existent connection of the sensor to the measuring point and/or the reference measuring point,
- detecting a pressure difference between the pressure (p2) at the measuring point, which is located upstream of the main flow regulator and downstream of the control valve, and a reference pressure (p0, p1) at a reference measuring point; and
- recognizing, via the electronic evaluation system, the sensor as not present or not connected and/or as having a poor or non-existent connection to the measuring point and/or the reference measuring point if the differential pressure is outside a predetermined tolerance range.

2. The method according to claim 1,
wherein the error is an incorrect or incorrectly inserted main flow regulator and the method comprises the following steps:
a. identifying a first differential pressure $p(t_{pp})$, with the sensor at a time $t_{pp}$ during the pre-purge phase with the safety valve closed, a defined position of the control valve and a fan speed of the fan;
b. identifying a second differential pressure $p(t_s)$, with the sensor at a time $t_s$ after the time $t_{pp}$ where the second differential pressure $p(t_s)$ is quasi-stationary, with the safety valve open, the defined position of the control valve and the fan speed of the fan;
c. determining a pressure difference between the second differential pressure $p(t_s)$ and the first differential pressure $p(t_{pp})$, in particular by subtracting the first differential pressure $p(t_{pp})$ from the second differential pressure $p(t_s)$, and determining a fuel mass flow rate of the known fuel through the main flow regulator from the pressure difference and the defined position of the control valve by the electronic evaluation system;
d. determining an actual pressure loss coefficient of the main flow regulator from the fuel mass flow and the pressure difference by the electronic evaluation system;
e. matching the actual pressure loss coefficient by the electronic evaluation system with a target pressure loss coefficient of a provided main flow regulator stored in the electronic evaluation system; and
in the event of a deviation of the actual pressure loss coefficient from the target pressure loss coefficient outside a predetermined tolerance, the electronic evaluation system detects that a main flow regulator used in the gas boiler does not correspond to the intended main flow regulator and that the main flow regulator used is therefore an incorrect or incorrectly inserted main flow regulator.

3. The method according to claim 1,
wherein the error is an uncalibrated or incorrectly calibrated control valve
and the method comprises the following steps:
a. identifying a first differential pressure $p(t_{pp})$, with the sensor at a time $t_{pp}$ during the pre-purge phase, with the safety valve closed, a defined position of the control valve and a predetermined or known fan speed of the fan;
b. identifying a second differential pressure $p(t_s)$, with the sensor at a time $t_s$ at which the second differential pressure $p(t_s)$ is quasi-stationary, with the safety valve open, the defined position of the control valve and the fan speed of the fan;
c. determining a pressure difference between the second differential pressure $p(t_s)$ and the first differential pressure $p(t_{pp})$, in particular by subtracting the first differential pressure $p(t_{pp})$ from the second differential pressure $p(t_s)$, and determining a fuel mass flow of the known fuel through the control valve from the pressure difference and a defined pressure loss characteristics of the main flow regulator by the electronic evaluation system, wherein the mass flow through the control valve and the defined position of the control valve form a pair of values belonging to an actual characteristic curve of the control valve;
d. determining a deviation of the actual characteristic curve of the control valve from a target characteristic curve of the control valve by the electronic evaluation system by comparing the pair of values with the target characteristic curve of the control valve (2); and
in the event of a deviation of the value pair from the target characteristic curve of the control valve outside of a predetermined tolerance, detecting an uncalibrated or incorrectly calibrated control valve.

4. The method according to claim 3,
shifting the target characteristic curve of the control valve by the deviation and thus approximated to the actual characteristic curve.

5. The method according to claim 1,
wherein the error is an incorrect fuel and the method comprises the following steps:
a. identifying a first differential pressure $p(t_{pp})$ with the sensor at a time $t_{pp}$ during the pre-purge phase, with the safety valve closed, a defined position of the control valve and a fan speed of the fan;
b. identifying a second differential pressure $p(t_s)$, with the sensor at a time $t_s$ where the second differential pressure $p(t_s)$ is quasi-stationary, with the safety valve open, the defined position of the control valve and the fan speed of the fan;
c. determining a pressure difference between the second differential pressure $p(t_s)$ and the first differential pressure $p(t_{pp})$, in particular by subtracting the first differential pressure $p(t_{pp})$ from the second differential pressure $p(t_s)$;
d. determining an actual fuel flowing in from the fuel inlet from the pressure difference, the defined position of the control valve and the predetermined mass flow delivered by the fan through the mixing device as well as a defined pressure loss characteristics of the main flow regulator;
e. comparing the actual fuel with a predetermined target fuel; and
detecting an incorrect fuel if the actual fuel does not correspond to the target fuel.

6. The method according to claim 1,
wherein the error is a missing or too low fuel pressure pg of the fuel flowing in through the fuel inlet and/or an incorrectly installed or not installed main flow regulator,
and the method comprises the following steps:
a. opening the safety valve;
b. igniting a burner of the gas boiler;
C. identifying whether the burner has been ignited;
d. if the burner has not been ignited, identifying a differential pressure curve with the sensor and the electronic evaluation system with the safety valve open for a predetermined time;
comparing, via the electronic evaluation system, the differential pressure curve with a predetermined tolerance field and detecting the error if the pressure curve lies outside the tolerance field, whereby a differential pressure which does not increase over the predetermined time and detecting a missing or too low fuel pressure pg and/or an incorrectly installed or not installed main flow regulator.

7. The method according to claim 6,
wherein a maximum permissible heating output of the gas boiler and/or a maximum permissible fan speed of the fan are/is reduced to a respective predetermined value if the fuel pressure pg is missing or too low.

8. The method according to claim 1,
wherein the safety valve is closed in the event of a sensor not being present or not being connected and/or having a poor or non-existent connection with the measuring point and/or the reference measuring point.

9. The method according to claim 1,
wherein the error is a defective safety valve or a defective control valve, and the method comprises the following steps:
a. identifying an actual differential pressure, with the sensor, with the safety valve open, a defined position of the control valve and a predetermined mass flow delivered by the fan through the mixing device;
b. determining a target differential pressure by the electronic evaluation system and a defined position of the control valve;
c. determining a deviation of the actual differential pressure from the target differential pressure; and
determining the electronic evaluation system, an error if the deviation is greater than a predetermined tolerance value.

10. A gas boiler designed to carry out a method according to claim 1.

* * * * *